Nov. 29, 1966 G. D. FEHELY 3,288,268
LUMBER CONVEYOR
Filed March 19, 1965 2 Sheets-Sheet 1

INVENTOR.
GLENN D. FEHELY
BY
Townsend and Townsend

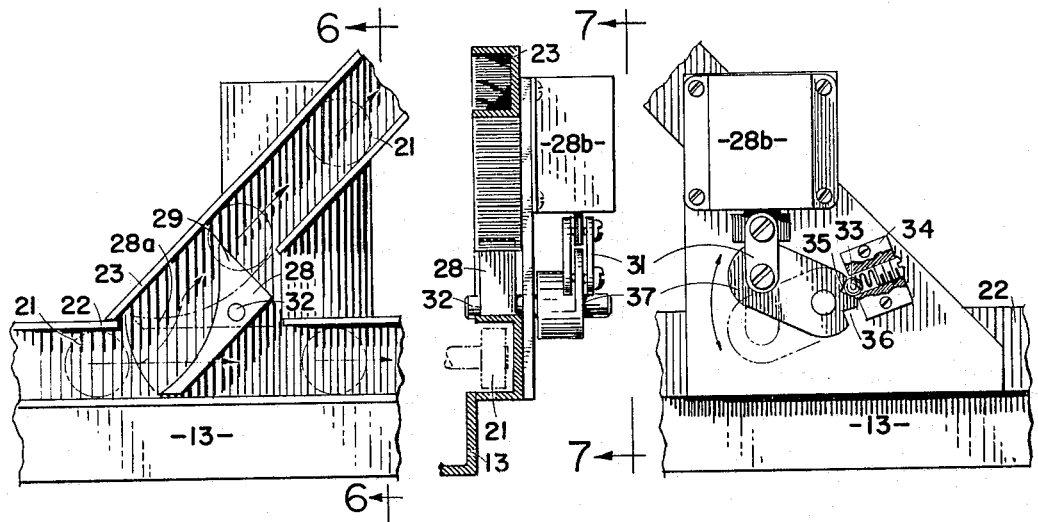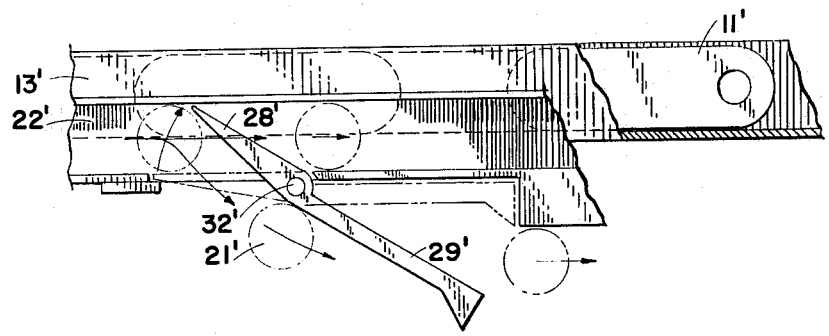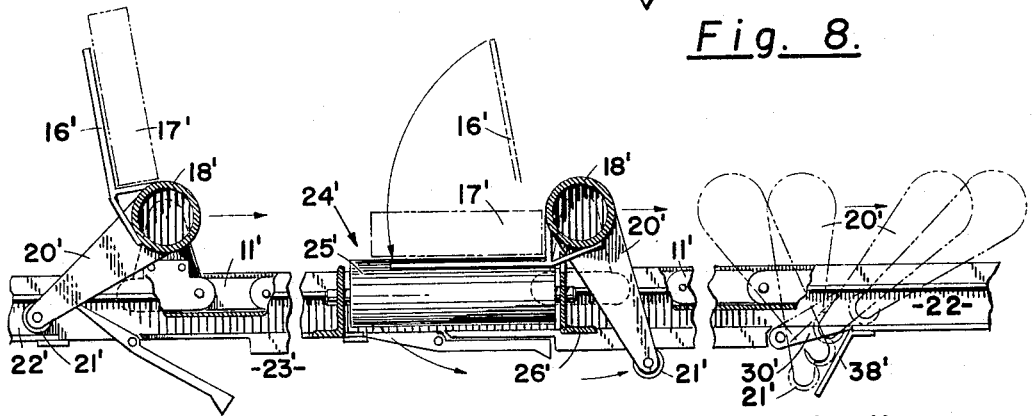

United States Patent Office 3,288,268
Patented Nov. 29, 1966

3,288,268
LUMBER CONVEYOR
Glenn D. Fehely, Arcata, Calif., assignor to Lumbermatic, Inc., Arcata, Calif., a corporation of California
Filed Mar. 19, 1965, Ser. No. 441,200
10 Claims. (Cl. 198—33)

This invention relates to an improved lumber conveyor of the type used in the grading and sorting of boards in a lumber mill. More specifically, it relates to an improvement in the conveyor of an "automatic green chain" and in particular to the discharge of boards at appropriate stations depending upon the grade and size of the boards.

Copending patent application Serial No. 405,952 filed October 23, 1964, now Patent Number 3,247,963, describes an automatic green chain of the type improved by this invention. Briefly, the relevant portion of the apparatus in said copending application comprises a main conveyor having a pair of spaced apart parallel chains which are powered. Spanning the chains are a plurality of rotatable dump carriers which are designed to carry boards in an "on-edge" position. Depending upon the grade of the board and its size, the board will trip appropriate microswitch probes while being carried. The microswitches close circuits to energize a tripping mechanism at a preselected unloading station. When the board reaches this station a mechanism causes the carrier to rotate and discharge the board onto a removal conveyor.

The present invention is directed to the mechanism for rotating the dump carrier and for causing the discharge of the board. As such, it is interchangeable with the mechanism described and claimed in said copending application for carrying out the same function.

The present construction utilizes a main or guide track disposed along the path of movement of the dump carrier. An arm or guide follower is attached to each dump carrier and is swingable about the axis of rotation of the carrier to thereby cause rotation of the carrier. The guide follower is engaged with the main track lying along the conveyor. Normal position of the arm in engagement with the main track maintains the carrier in an upright board carrying position.

Discharge of the board is accomplished by directing the guide follower along a side track or shunt path which forms a closed loop with the main track. When the guide follower travels over the side track, the carrier is caused to rotate. This is achieved by so shaping the side track that when the guide follower travels thereover it will move to either a higher or lower elevation than the main track and thereby rotate the carrier.

As before, a switching mechanism is utilized to direct the guide follower either along the main track or an appropriate side track. This may suitably be accomplished with a mechanism similar to that used in said copending application. For example, the signal generated by board contact with probes of microswitches positioned to detect the grade and size of a board on each carrier may be transmitted to a switching track in this improvement instead of the tripping mechanism in said copending application. The switching track of the preferred embodiment in this invention causes the guide follower to either divert to a particular side track representing the place of collection of the size and grade of board on its associated load carrier, or bypass the side track if inappropriate as the case may be.

The present construction has a number of advantages over that described in the copending application. Principal among these includes the fact that there is no loss of control of the board during the moment of discharge. In the prior construction, the dump carrier was tripped and the board would free fall to a removal conveyor. In the present construction, the rotating movement of the conveyor is at all times positively controlled in relation to the position of the guide follower along the side track which achieves better control and stability of the apparatus in general. Consequently, the present construction eliminates noise and jar caused by free falling boards, and provides less over-all vibration of the apparatus and prolonged life of the conveying equipment. At the same time, it eliminates any likelihood of damage to the board which could result from a free fall.

The present modification provides another prime advantage in that it is now possible to rotate the dump carrier rearwardly of its direction of movement and discharge the board through the area just vacated by the dump carrier. This is instrumental in achieving the sliding movement of the board from the carrier onto the removal conveyor without a free fall being interposed. In addition, the unloading operation in general is accelerated by this rearward unloading procedure, with the board reaching the removal conveyor more rapidly than before. A speed up of the entire green chain operation is thus possible.

Finally, the present construction permits, if desired, a central supporting rail for contacting an appendage depended from the center of each rotating carrier, giving support to the carrier at a point that is subject to sag under the weight of heavy boards. This permits the use of a lighter weight cross member construction.

With reference to the drawings:

FIG. 5 is a sectional view showing the switching member which determines whether the guide follower will take the main track or the side track at each unloading station.

FIG. 6 is an end sectional view of the mechanism shown in FIG. 5 and also including the position of the solenoid which actuates the switching member.

FIG. 7 is an end elevation of the portion of the apparatus of FIGS. 5 and 6 showing the movements of the solenoid for actuating the switching member.

FIGS. 8 through 11 illustrate an alternate embodiment for the side track and rotation inducing mechanism wherein the guide follower arm is shunted below the level of the main track instead of above the main track as in the embodiment of FIGS. 1–7.

Figure 1:
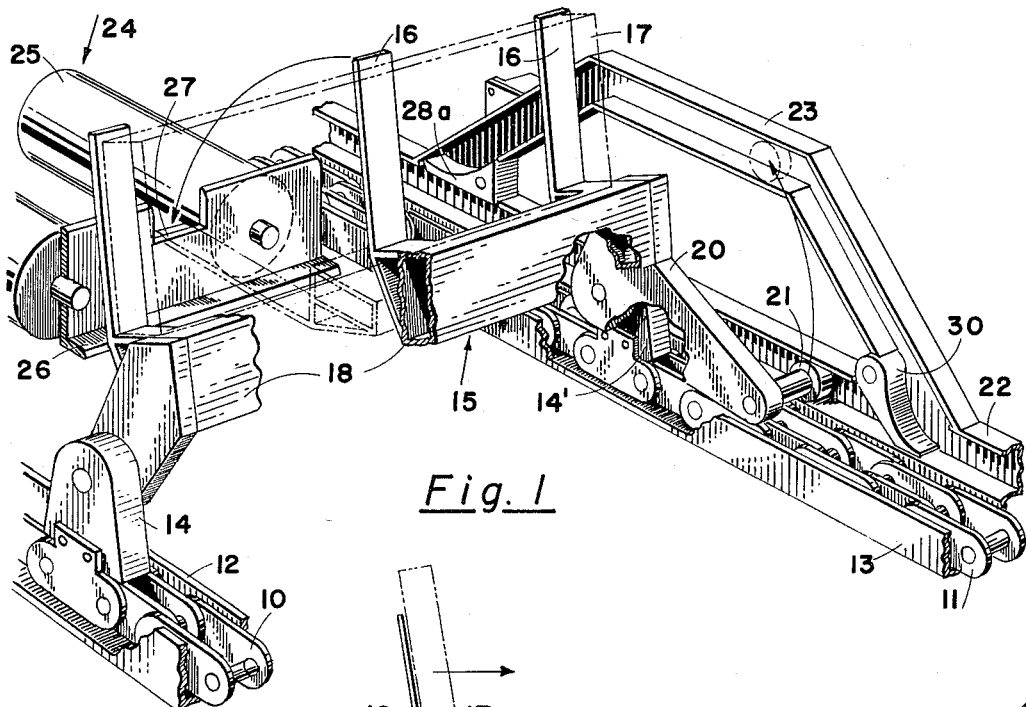
FIG. 1 shows a perspective view of parts of the powered parallel conveyor chains together with rotating discharge carrier having parts broken away in the vicinity of an unloading station and including its side track and removal conveyor.

In more detail, FIG. 1 shows a pair of spaced apart parallel driving chains 10 and 11 of the type utilized in the above cited copending application. Chains 10 and 11 ride in parallel channels 12 and 13 respectively. A pair of blocks 14 and 14' are attached to chains 10 and 11 respectively and support the board carrier shown generally at 15. Board carrier 15 is preferably made so as to have a generally right angle V cross section with a plurality of spaced apart upwardly extending fingers 16 joined to form one side of the V. A board is thereby capable of being carried in an "on-edge" position as shown by typical board 17 which rests on cross member 18 of board carrier 15.

Cross member 18 is rotatably mounted at each end within supporting blocks 14 and 14' on suitable bearing surfaces. End 19 of cross member 18 includes a fixedly joined outwardly extending guide follower or arm 20. Guide follower 20 is swingable about the axis of rotation of carrier 15 and when so moved causes carrier 15 to rotate. Guide follower 20 has a wheel 21 rotatably mounted on the outermost end thereof to facilitate movement of follower 20 on the various guiding surfaces.

Figure 2:
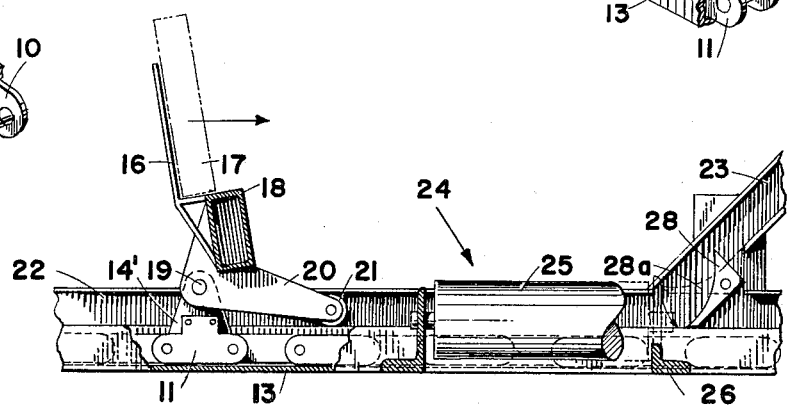
FIG. 2 is a side sectional view showing the construction of the rotating discharge carrier in combination with the guide follower and main guide track.

Wheel 21 is positioned to ride within a main guide track 22 which runs parallel to and adjacent chain 11. When wheel 21 is within the channel of main track 22 rotating carrier 15 is maintained in a normally upright board carrying position as shown in FIG. 2.

At an unloading station such as illustrated in FIG. 1 a shunt path comprising a side track 23 is in communication with main track 22 and forms a closed loop therewith. As guide follower 20 and wheel 21 approach entrance 24 to side track 23, wheel 21 and guide follower 20 can alternatively take either main track 22 or side track 23. When guide follower 20 is directed into side track 23 (see FIG. 3) guide follower 20 is moved upwardly to a higher elevation than main track 22. During this movement cross member 18 is in turn caused to rotate rearwardly and board 17 slides from fingers 16 onto a removal conveyor shown generally at 24.

Figures 3, 4:
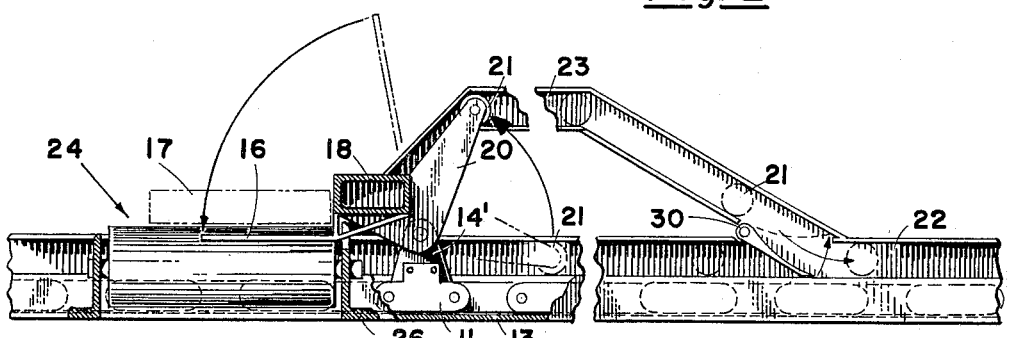
FIG. 3 is a side sectional view showing the position of the carrier in rotated discharge position with the guide follower raised by the side track and a board to be discharged resting on the removal conveyor.
FIG. 4 is a side sectional view showing the mechanism for re-entry of the guide follower from the side track to the main track.

Particularly with reference to FIG. 3, removal conveyor 24 includes a plurality of live powered rolls 25. Removal conveyor 24 is positioned beneath the plane of movement of carrier 15 and parallel thereto. A guide wall 26 is positioned along the edge of rollers 25 and includes a plurality of slots or notches 27 spaced so that fingers 16 will mesh therewith when guide follower 20 is at that place in side track 23 which causes maximum rearward rotation of member 18. FIG. 3 shows fingers 16 positioned within slots 27 with board 17 being discharged to the rear of lumber guide 26.

As carrier 15 proceeds along its direction of movement guide 26 prevents board 17 from continuing along with the carrier with the result that board 17 remains on live rolls 25 for transverse movement away from the unloading station. As guide follower 20 reaches the end of side track 23 and re-enters main track 22 lumber carrier 15 is rotated back to the upright board carrying position.

Entrance and exit of guide follower 20 into a side track 23 is accomplished as follows. With reference to FIG. 5 in particular, a switching track member 28 is mounted at the juncture between side track 23 and main track 22 in the vicinity of entrance 28a. Switching track 28 is pivotally mounted for movement between a first position shown in FIG. 5 in solid lines and a second position shown in FIG. 5 in dotted lines. In the solid line position guide follower 20 will be caused to enter side track 23. As the wheel 21 of guide follower 20 proceeds up the first portion of side track 23 it comes in contact with edge 29 of switching track 28, depresses edge 29 and causes switching track 28 back to the position shown in dotted lines in FIG. 5 in readiness for the next cycle.

Exit of guide wheel 21 and guide follower 20 from side track 23 back to main track 22 is illustrated in FIG. 4. A door 30 is normally positioned as shown in solid lines so as to provide a smooth surface upon which guide wheel 21 returns to main track 22. Where the guide wheel bypasses side track 23 and comes to the position of door 30 along main track 22, wheel 21 pushes door 30 up into the position shown in dotted lines and continues by this junction. Door 30 thereupon returns to the position shown in solid lines in FIG. 4 under its own weight or by spring action.

Switching track section 28 is actuated by solenoid 28b through a pair of pivotally linked arms 31 connected to solenoid 28b at one end and to switching track section 28 at its other end through pin 32. When solenoid 28b is actuated to pull arm pair 31 upwardly, pin 32 is rotated and thereby causes switching track section 28 to move down and assume the position shown in FIG. 5. The various parts are held in this position (shown in solid lines in FIG. 7) by a detent 33 mounted on bracket 34 and engageable with notches 35 and 36 in the end 37 of arm pair 31.

As described above, when guide wheel 21 engages end 29 of switching track section 28, track section 28 is pushed back into the position shown in dotted lines of FIG. 5. This movement turns pin 32 and causes a corresponding movement of arm pair 31 for return to the position shown in dotted lines in FIG. 7 in readiness for receipt of the next signal.

Solenoid 28b is suitably actuated by an electrical signal from microswitch probes or other means which respond to board size and grade in the manner described in the above cited copending application. When a board of appropriate size and grade is to be discharged at the station illustrated in FIG. 1, for example, solenoid 28b will be actuated to cause switching track 28 to be pulled into the position shown in FIG. 5. Movement of guide wheel 21 through side track 23 will thereby cause rotation of member 18 rearwardly and the sliding of board 17 onto live rolls 25 for removal thereof.

In the alternate embodiment shown in FIGS. 8 through 11, side track 23' is positioned below the elevation of main track 22'. In this case switching track member 28' is an elongate member pivoted as before about a pin 32' actuated by a solenoid (not shown) between a position shown in solid lines in FIG. 8 for purposes of diverting the guide follower onto side track 23' and a normal position shown in dotted lines in FIG. 8. When switching track member 28' is pivoted as shown in FIG. 8, guide wheel 21' is diverted and moves downwardly to the position shown in the dotted lines and then along the under side of switching track member 28'. Continued forward movement of cross member 18 will cause switching track member 28' to be pivoted back to its starting position as wheel 21' strikes edge 29' of switching track member 28'.

While wheel 21' is in side track 23' the weight of a board such as board 17' on fingers 16' causes the rearward rotation of cross member 18' as before and deposit of board 17' onto live rolls 25' behind guide wall 26' (see FIG. 10).

Further movement along the path permits guide wheel 21' to re-enter the main track 22' through door 30'. At the point of re-entry wheel 21' is stopped by an inclined plate 38 and a spring loading (not shown) on door 30' holds wheel 21' in the down position until the pull of the main conveyor chains brings the cross member 18' directly overhead (see FIG. 11). At this point the pull of the chains will overcome the spring loading of door 30', raise follower 20' with its wheel 21' back to main track 22' and the carrier unit will resume the upright position shown in FIG. 9.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a lumber conveyor of the type having a rotatably mounted carrier for each board, and including means to rotate each carrier to discharge a board therefrom at a preselected unloading station along the conveyor, improved board discharging means comprising a guide follower attached to each carrier and extending outwardly therefrom, said follower being swingable about the axis of rotation of said carrier to rotate said carrier into discharge position, a guide disposed adjacent the conveyor for engagement with said follower to normally maintain the carrier in board carrying position, a shunt path in said guide at each unloading station, movement of the follower along the shunt path causing its carrier to rotate and discharge, and means to divert the follower from the guide along a preselected shunt path.

2. A lumber conveyor in accordance with claim 1 wherein said shunt path is formed so that movement of the guide follower along the shunt path causes rotation of said carrier rearwardly of its direction of movement along the conveyor for discharge of a board through the area just vacated by the rotated carrier.

3. A lumber conveyor in accordance with claim 1 and including a removal conveyor disposed transversely below the path of said carrier positioned at each unloading station to receive a board discharged from a rotated carrier, the top of said removal conveyor being sufficiently close to the board and the carrier in the rotated position so that the board moves directly onto the removal conveyor substantially without free falling as the carrier continues in its direction of movement.

4. In a lumber conveyor of the type having a rotatably mounted carrier for each board, and including means to rotate each carrier to discharge a board therefrom at a preselected unloading station along the conveyor, improved board discharging means comprising a track engaging member mounted on each carrier and extending outwardly therefrom, said track engaging member being swingable about the axis of rotation of said carrier to rotate the carrier into discharge position, a guide track disposed along said conveyor, said track engaging member being engaged with said guide track to maintain the carrier in board carrying position while the carrier is advanced along the conveyor, a shunt path comprising a closed loop of track communicating with said guide track at each unloading station, a switching section of track moveable between a first position and a second position associated with the junction between said guide track and shunt path, the first position of said switching track joining said guide track and shunt path and the second position of said switching track bypassing said shunt path to provide continued movement of the track engaging member along the guide track, said shunt path track being positioned so that movement of said track engaging member therealong causes its associated board carrier to rotate and discharge.

5. An improved conveyor for sorting lumber comprising, in combination, at least one dump carrier rotatably mounted transversely across said conveyor for movement therealong, a removal conveyor beneath the path of said dump carrier and parallel thereto to receive a board discharged from the dump carrier, a main track alongside the path of said dump carrier, a closed loop side track communicating with said main track adjacent said removal conveyor, a track engaging arm attached to said dump carrier extending outwardly therefrom and fixedly engaged to said main track, controlled switching means to direct said arm alternatively along said main track or said side track, said dump carrier being supported in upright board carrying position when said arm is directed along the main track, and said dump carrier being rotated into discharge position over said removal conveyor when said arm is directed along said side track.

6. An improved conveyor in accordance with claim 5 wherein said switching means includes a section of track moveable between a first position and a second position, said first position linking said main track with the entrance to the loop of said side track, and the second position linking said main track so as to bypass said side track, and a solenoid connected to said switching section of track for the movement thereof from said second to said first position in response to signals generated by the grade of board carried on said dump carrier.

7. An improved conveyor in accordance with claim 5 and including means actuated by the passage of said arm over said track for movement of said switching section of track from said first position to said second position.

8. An improved conveyor for sorting lumber comprising, in combination, at least one dump carrier having a generally right angle V-shaped cross section and including spaced projections extending upwardly to form one side of the V for supporting a board on edge on the dump carrier, said dump carrier being rotatably mounted transversely across the conveyor for movement therealong, said conveyor including powered chains defining the longitudinal perimeters thereof so that the dump carriers discharge by rotating and permit the board to pass between the chains, a plurality of unloading stations along said conveyor, each unloading station including a roller conveyor transversely of said chain conveyor, the top of said roller conveyor lying beneath the path of movement of the dump carriers, a guide wall along one side of said roller conveyor including notches cooperatively spaced to receive the projections on a dump carrier when the dump carrier is rotated into discharge position, a guide track along said chain conveyor, an arm attached to said track and the dump carrier to maintain said dump carrier normally in an upright board carrying position during movement, a side track adjacent each unloading station connected to said guide track and defining a closed loop, means to cause said arm to selectively follow said main track or said track at each unloading position, a portion of said side track loop lying at an elevation different than said main track so that movement of said arm along said side track causes said dump carrier to rotate rearwardly of its direction of movement along the conveyor and a board being carried thereon will slide without falling onto said roller conveyor, said arm thereafter leaving said side track at the end of the loop, reentering said guide track and thereby causing the dump carrier to be rotated upwardly into board carrying position.

9. An improved conveyor in accordance with claim 8 wherein said side track loop includes a portion higher than said main track.

10. An improved conveyor in accordance with claim 8 wherein said side track loop includes a portion lower than said main track.

References Cited by the Examiner
UNITED STATES PATENTS 3,247,963  4/1966  Fehely _____ 209—75

FOREIGN PATENTS 717,755  9/1965  Hansel et al.

M. HENSON WOOD JR., *Primary Examiner.*

J. N. ERLICH, *Assistant Examiner.*